E. H. BATES.
Assignor of one-half interest to T. VAN SKELLINE.
Brackets.
No. 8,464. Reissued Oct. 22, 1878.
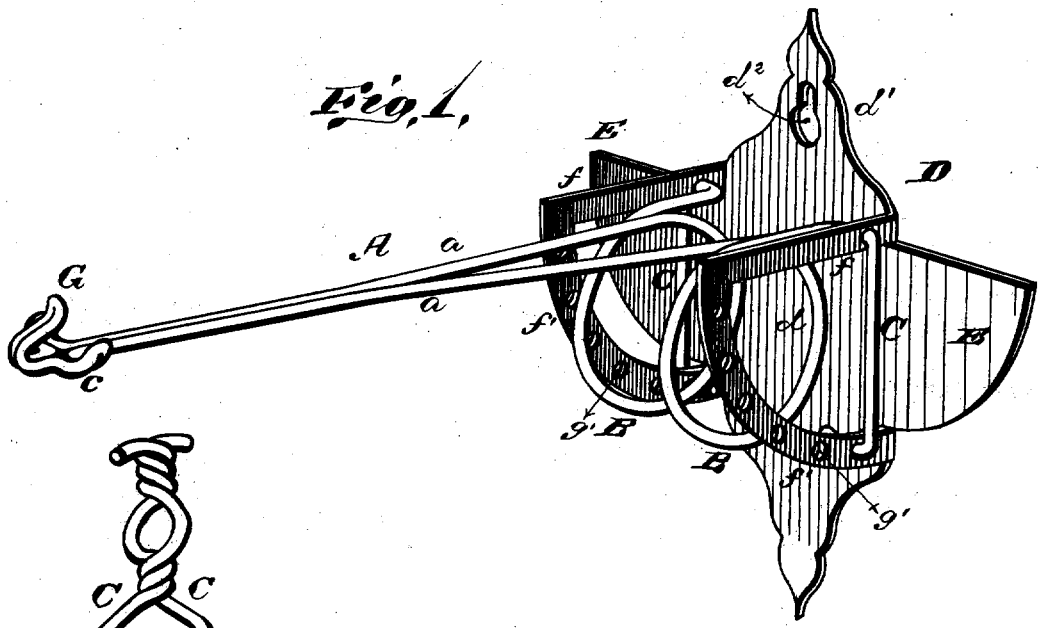
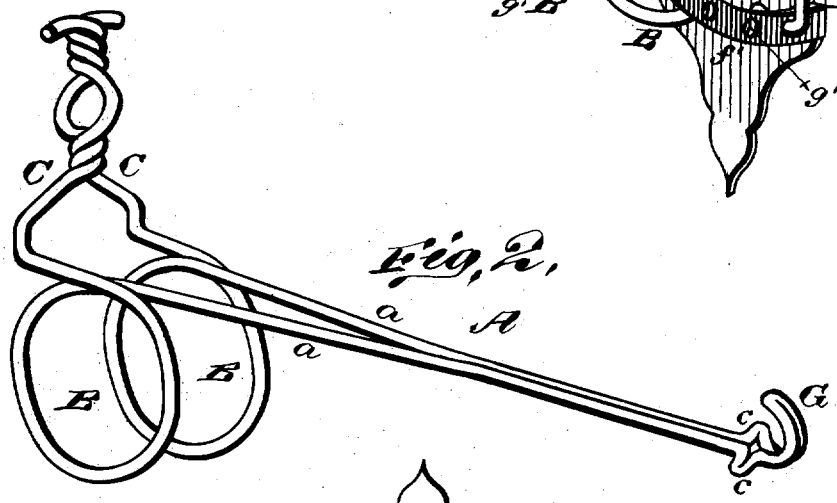
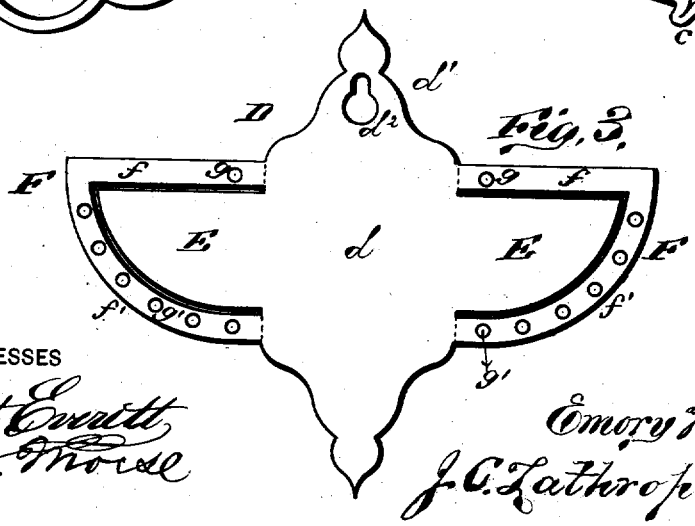
WITNESSES
Robert Everett
B. H. Morse
INVENTOR
Emory H. Bates,
J. C. Lathrop
ATTORNEY.
N. PETERS, PHOTO-LITHOGRAPHER, WASHINGTON, D. C.

UNITED STATES PATENT OFFICE.

EMORY H. BATES, OF WASHINGTON, DISTRICT OF COLUMBIA, ASSIGNOR OF ONE-HALF INTEREST TO THEODORE VAN SKELLINE.

IMPROVEMENT IN BRACKETS.

Specification forming part of Letters Patent No. 189,833, dated April 24, 1877; Reissue No. 8,464, dated October 22, 1878; application filed October 1, 1877.

*To all whom it may concern:*

Be it known that I, EMORY H. BATES, of Washington, in the county of Washington and District of Columbia, have invented certain new and useful Improvements in Brackets for Suspending Bird-Cages, reference being had to the accompanying drawings, as will be hereinafter more fully described.

Figure 1 is a perspective view of my improved bird-cage bracket. Fig. 2 is a perspective view of a modified form of the same. Fig. 3 represents the back or base plate in blank form.

This invention relates to brackets for suspending bird-cages, and its peculiar construction will allow the same to move like a bough stirred by the wind; and it consists in constructing the bracket-arm of one continuous piece of wire, which is doubled back from the extreme outer end, and the two parts running parallel to each other, the rear portion thereof being formed into coils, which coils are designed to impart elasticity to the bracket-arm; and it further consists of a back or base plate, by means of which the bracket-arm may be adjusted for the purpose of increasing the tension of the spring when an unusually heavy weight is suspended therefrom, as will be hereinafter more fully explained.

The annexed drawing, to which reference is made, fully illustrates my invention.

A designates my improved bracket-arm, which is constructed of one continuous piece of wire, the two portions *a a* being bent at the extreme outer end, that forms the hook by which the cage is to be suspended, and running back parallel to each other, and the rear portion thereof formed into coils B B, which coils are designed to impart elasticity to the bracket-arm A. In the rear of said coils B B their wires are continued to form two projecting arms, C C, which arms may be bent in the form shown in Fig. 1 of the drawing, for attaching the same to base-plate D; or they they may also be twisted in the form shown in Fig. 2 of the drawing, for the attachment of the upper twisted end directly to a nail, by which it is to be suspended, thereby dispensing entirely with a back or base plate.

D, Fig. 1, designates a fastening or base plate formed from a sheet-metal blank. (Shown in Fig. 3.) Said blank consists of a middle or back piece, *d*, a small upward extension, $d^1$, which is provided with a vertical key-hole-shaped slot, $d^2$, and wings E E, rim-pieces F F, which rim-pieces are separated from said wings in the operation of stamping. In preparing said base or back plate for use, the rim-pieces F F are bent outward at right angles to back piece *d*; but wings E E and upward extension $d^1$ remain flat and even with said back, so as to rest squarely against a wall. When in this latter position wings E E serve as braces for back *d*, to prevent it from being twisted sidewise. When rim-pieces F F are bent forward, as stated, each of them consists of a projecting upper horizontal plate or bar, *f*, and a lower segmental plate, *f'*, which curves downward and backward therefrom to back plate *d*. Each upper horizontal plate, *f*, is provided with a small perforation, *g*, near its junction with back plate *d*, and each segmental plate *f'* is provided with a series of similar perforations, *g'*, extending, at regular intervals, from the upper end of said segmental plate to the lower end thereof. Said parts *f f'*, with perforations *g g g' g'* on the opposite sides of said bracket, are counterparts of each other, and together constitute the bearings or supports for the bracket-arm A, from which the bird-cage is suspended. The rear portion of the doubled wire is set between the bearings or supports above described, and the end of said wire behind each coil is bent so as to pass outward through one of the openings, *g*, and inward again through one of the openings *g'*, as shown in Fig. 1.

If the spring weakens by long use, or when an unusually heavy cage is to be suspended thereby, the bent rear ends, C, of said spring are set forward one or more holes, *g' g'*. This has the effect of tipping upward the arm A unless the weight thereon is too heavy to be thus raised, and of increasing the resistance of the spring sufficiently to fit it for the performance of its function.

The doubled wire forming the arm A converges at it is front end to a point, which is bent upward into a hook, G. In the rear of said hook said arm is again bent so as to form a stop or upward fold, *c*. The two wires forming the arm diverge obliquely from each other, so as to form said stop *c*. From hook G the bird-cage is suspended by the ring attached to the upper part thereof, and stop *c* prevents the cage sliding backward toward the base-plate D, and also prevents a rotary motion of the cage. By depressing the outer end of arm A, hook G is brought into such a position that the ring of the bird-cage can be readily slipped on or off the same. The elasticity of bracket-arm A will restore it to its proper position as soon as the pressure is removed.

Having thus fully described my invention, what I claim as new, and desire to secure by Letters Patent, is—

1. A bracket-arm constructed of one continuous piece of wire, the two parts *a a* running parallel to each other, the rear portion thereof formed into coils B B, and having projecting arms C C, for attaching the same to a base or back plate, if desired, substantially as and for the purposes set forth.

2. The spring-arm A, having hook G, stop *c c*, arms *a a*, coils B B, and bent rear ends, C C, substantially as and for the purpose set forth.

3. The base-plate D, provided with arms *f f*, perforated at *g g*, upward extension $d^1$, having key-hole-shaped slot $d^2$, segmental plates *f′ f′*, and perforations *g′ g′*, substantially as and for the purpose set forth.

4. In a bracket for suspending bird-cages, the hook G, having projections or stops *c c*, for the purpose of preventing a rotary and backward movement to the cage, substantially as and for the purpose set forth.

5. A bracket or base, D, provided with segmental plate *f′ f′*, having perforations *g′ g′*, for regulating the tension of the spring-bracket arm A, substantially as and for the purpose set forth.

6. A spring-bracket for suspending bird-cages, in combination with devices for adjusting the tension of the spring, substantially as and for the purpose set forth.

7. The combination of the spring-arm A, having bent ends C C, with segmental adjusting-plates *f′ f′*, substantially as and for the purpose set forth.

8. A bird-cage bracket constructed with a spring interposed between the supporting-arm and back or base plate, substantially as and for the purpose set forth.

In testimony that I claim the above I have hereunto subscribed my name in the presence of two witnesses.

EMORY H. BATES.

Attest:
ROBERT EVERETT,
N. M. D. LATHROP.